United States Patent [19]

Rappen et al.

[11] Patent Number: 5,246,102

[45] Date of Patent: Sep. 21, 1993

[54] CLOSED BELT CONVEYOR ARRANGEMENT

[75] Inventors: Albert Rappen, Mülheim an der Ruhr; Joachim Holz, Dortmund, both of Fed. Rep. of Germany

[73] Assignee: VRS Engineering GmbH Fordertechnik, Ruhr, Fed. Rep. of Germany

[21] Appl. No.: 824,349

[22] Filed: Jan. 23, 1992

[30] Foreign Application Priority Data

Jan. 23, 1991 [DE] Fed. Rep. of Germany ... 9100742[U]

[51] Int. Cl.⁵ .................................... B65G 21/02
[52] U.S. Cl. .................... 198/860.2; 198/861.1; 198/828; 198/819
[58] Field of Search ............ 198/808, 819, 594, 860.2, 198/861.1, 823, 828, 830, 831

[56] References Cited

U.S. PATENT DOCUMENTS

| | | | |
|---|---|---|---|
| 3,920,115 | 11/1975 | Craggs | 198/861.1 X |
| 4,146,126 | 3/1979 | Mattos | 198/861.1 |
| 4,467,914 | 8/1984 | Trammel et al. | 198/860.2 |
| 4,856,643 | 8/1989 | Lachonius et al. | 198/861.1 X |
| 4,934,516 | 6/1990 | Dugan | 198/860.2 |
| 4,958,724 | 9/1990 | Hashimoto | 198/819 |
| 5,052,545 | 10/1991 | Gongen | 198/841 X |

FOREIGN PATENT DOCUMENTS

| | | | |
|---|---|---|---|
| 1049197 | 1/1952 | France | 198/808 |
| 2270171 | 12/1975 | France | 198/819 |
| 2650995 | 2/1991 | France | 198/823 |
| 0061207 | 3/1991 | Japan | 198/823 |
| 0888111 | 1/1962 | United Kingdom | 198/808 |

Primary Examiner—Robert P. Olszewski
Assistant Examiner—James R. Bidwell
Attorney, Agent, or Firm—Tarolli, Sundheim & Covell

[57] ABSTRACT

A closed belt conveyor arrangement for transporting material along a conveyor path having a support structure for supporting the conveyor belt and a plurality of roller elements. The support structure including an elongated support profile beam, supports attached directly to the support profile beam for supporting the profile beam, and a plurality of roller support frames attached independently of the supports to the support profile beam wherein the support profile beam is the only structural supporting element extending between the roller support frames.

42 Claims, 12 Drawing Sheets

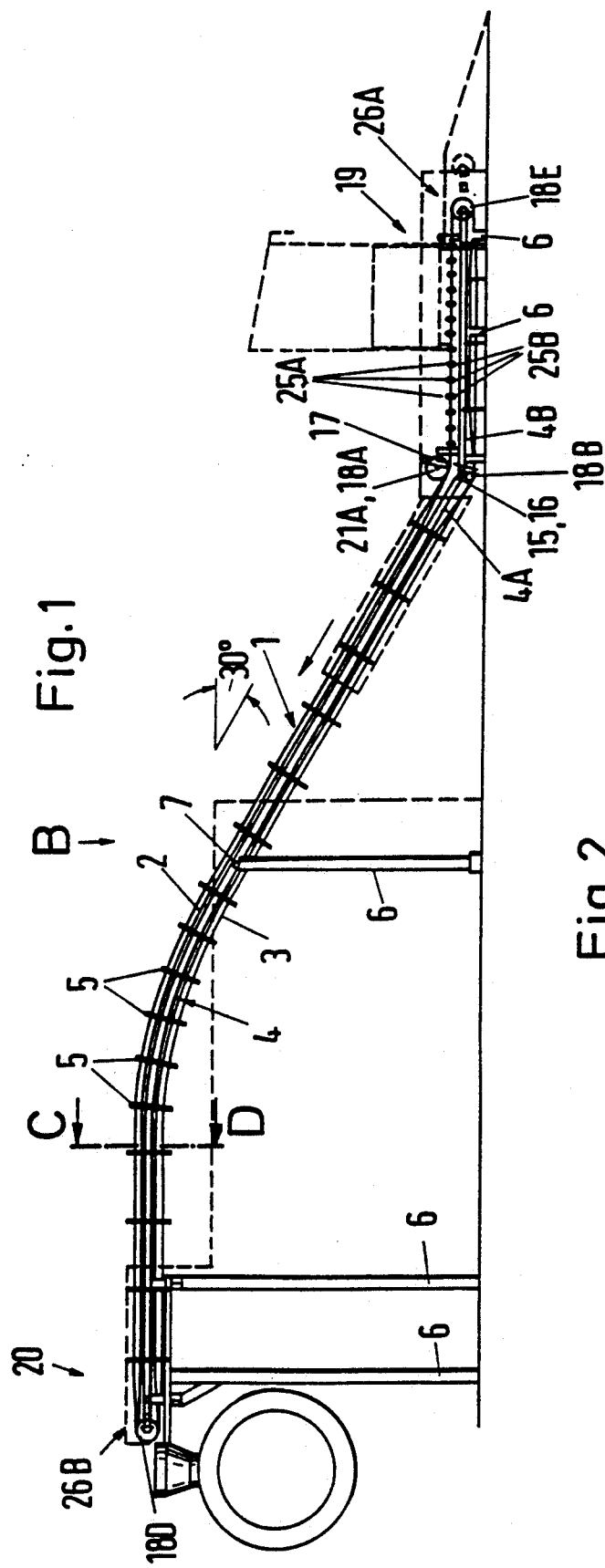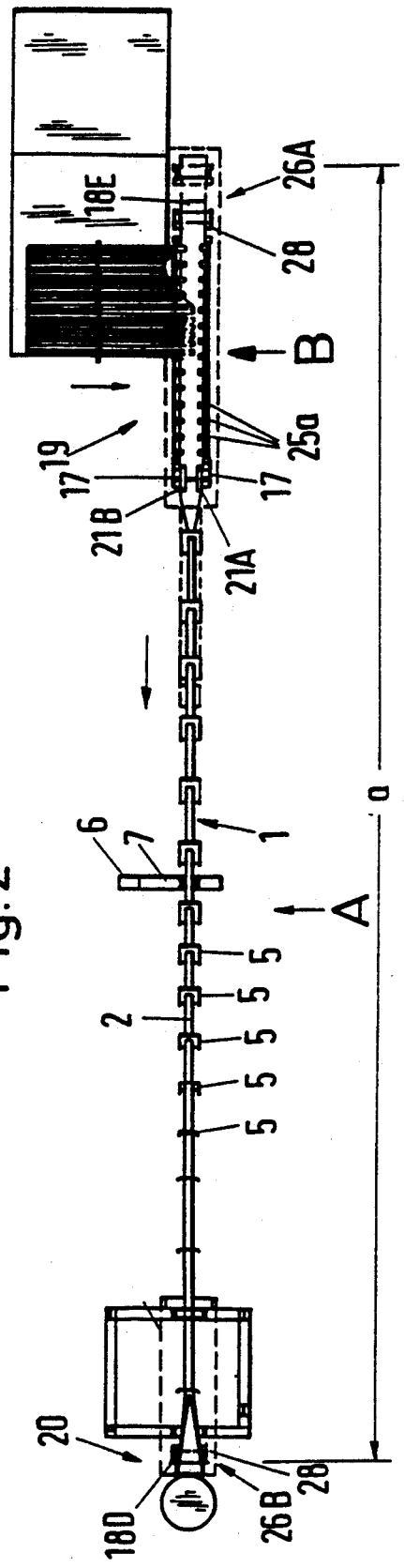
Fig. 1
Fig. 2

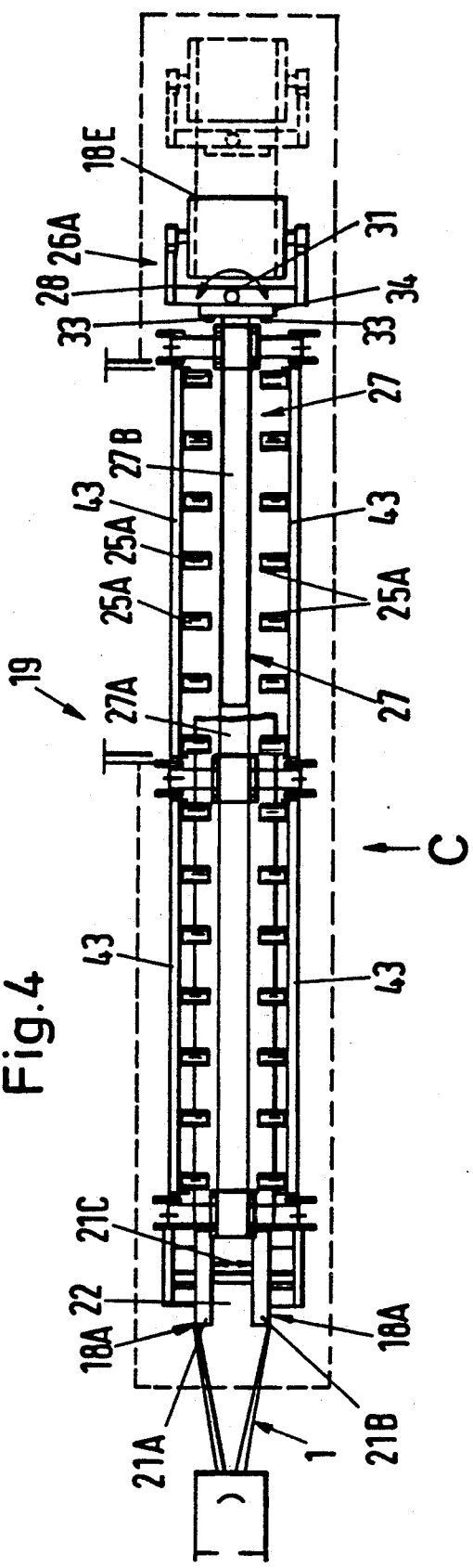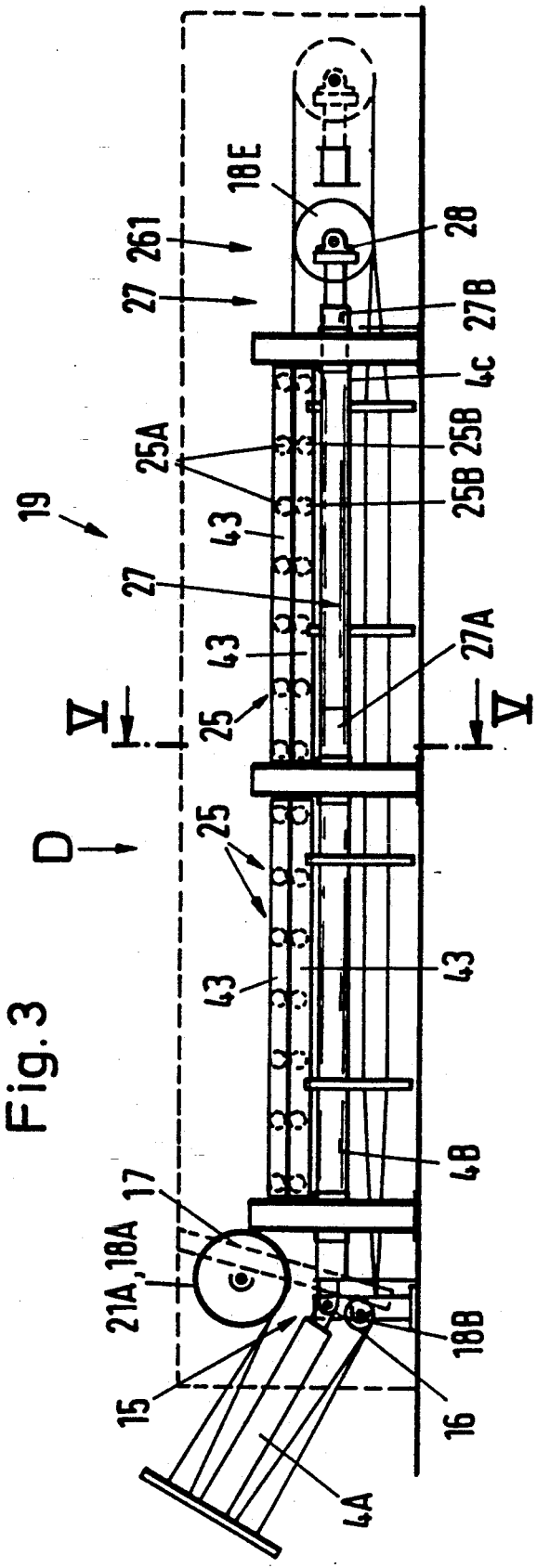

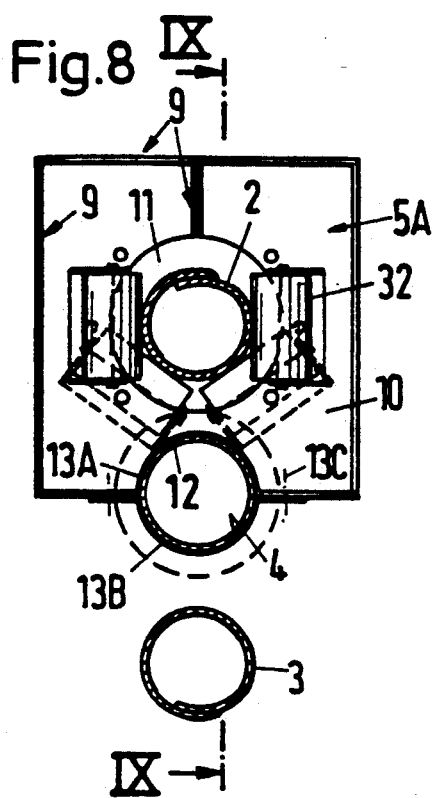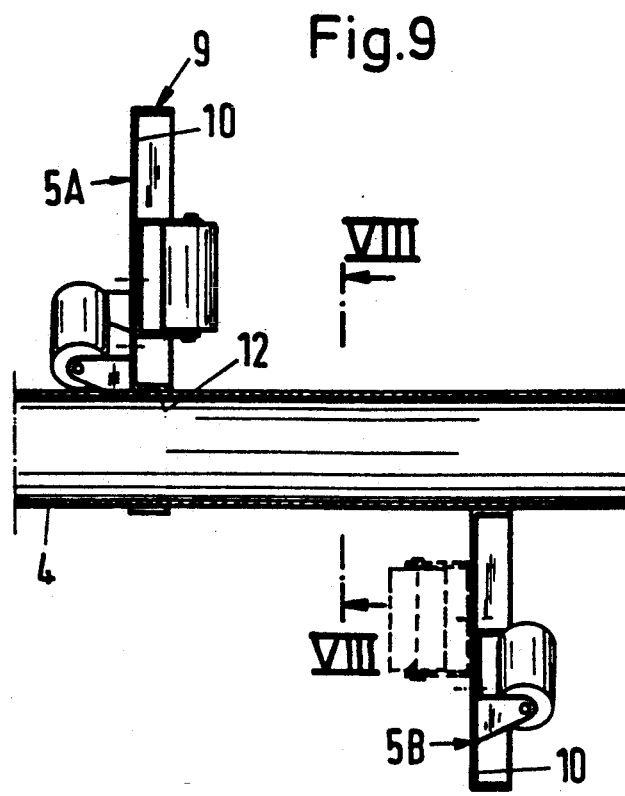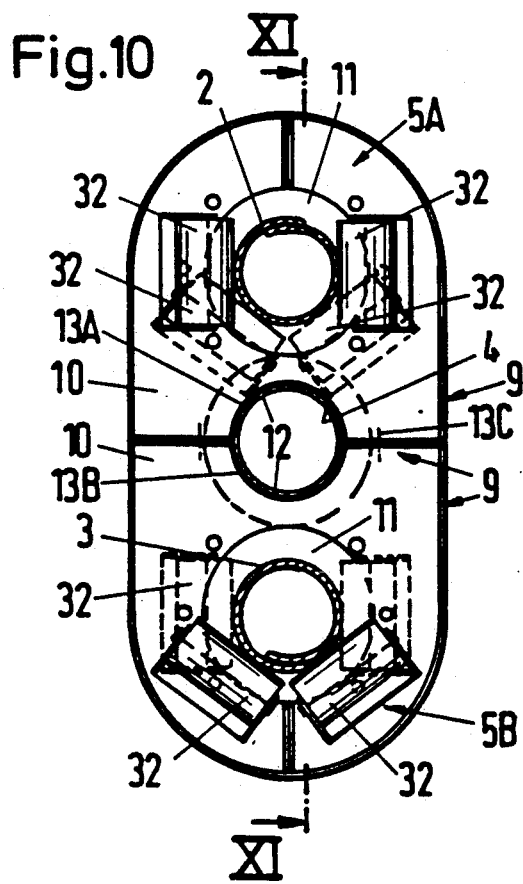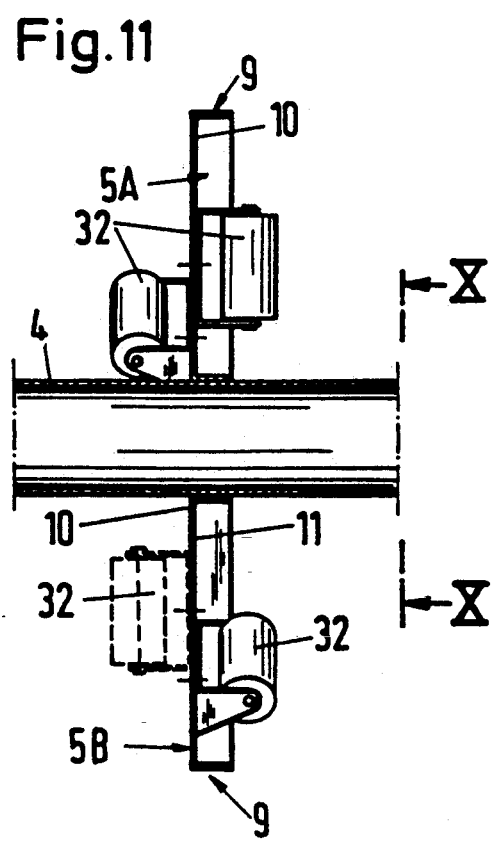

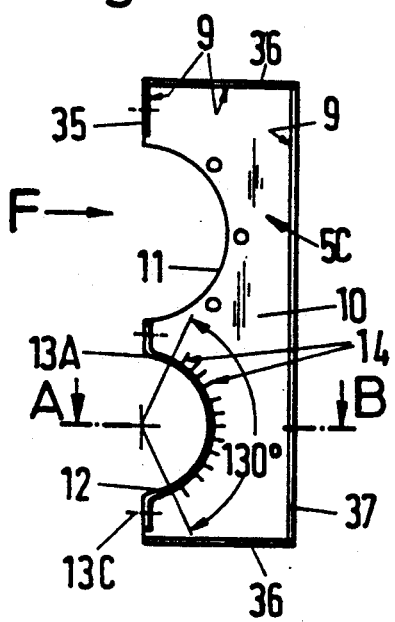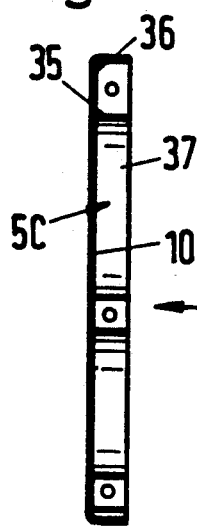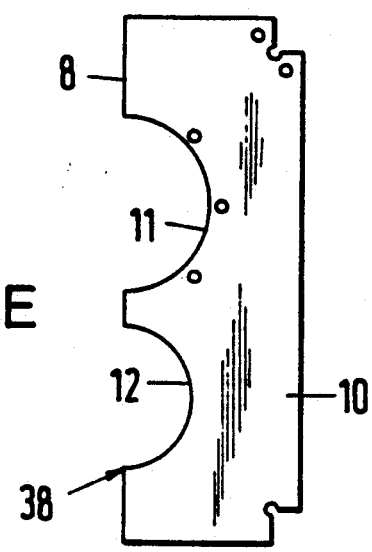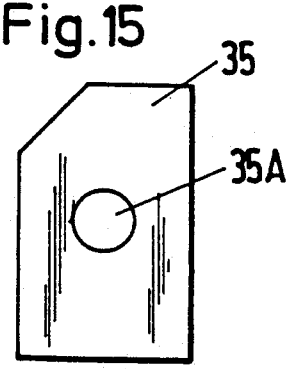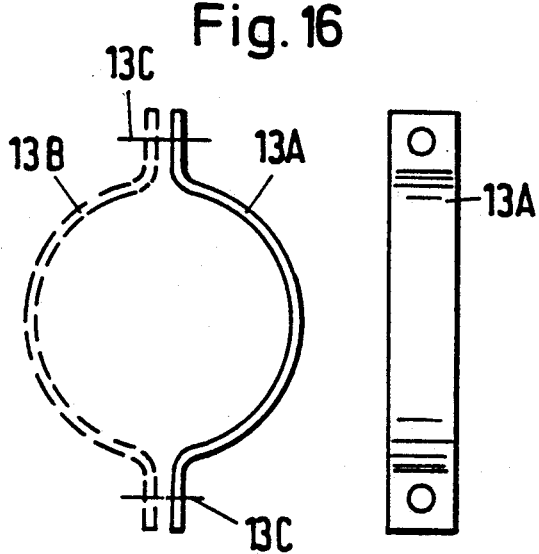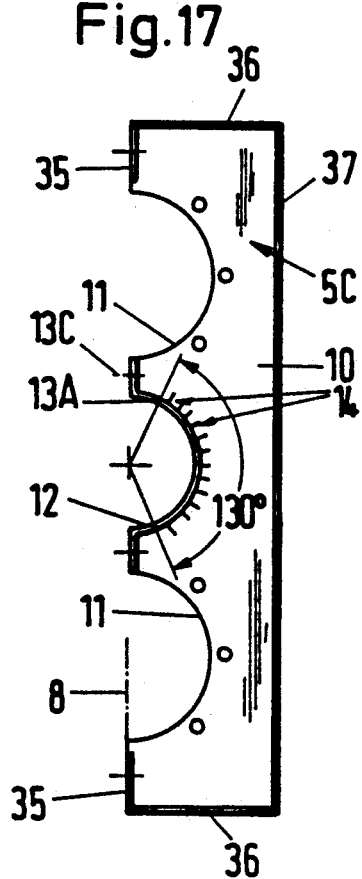

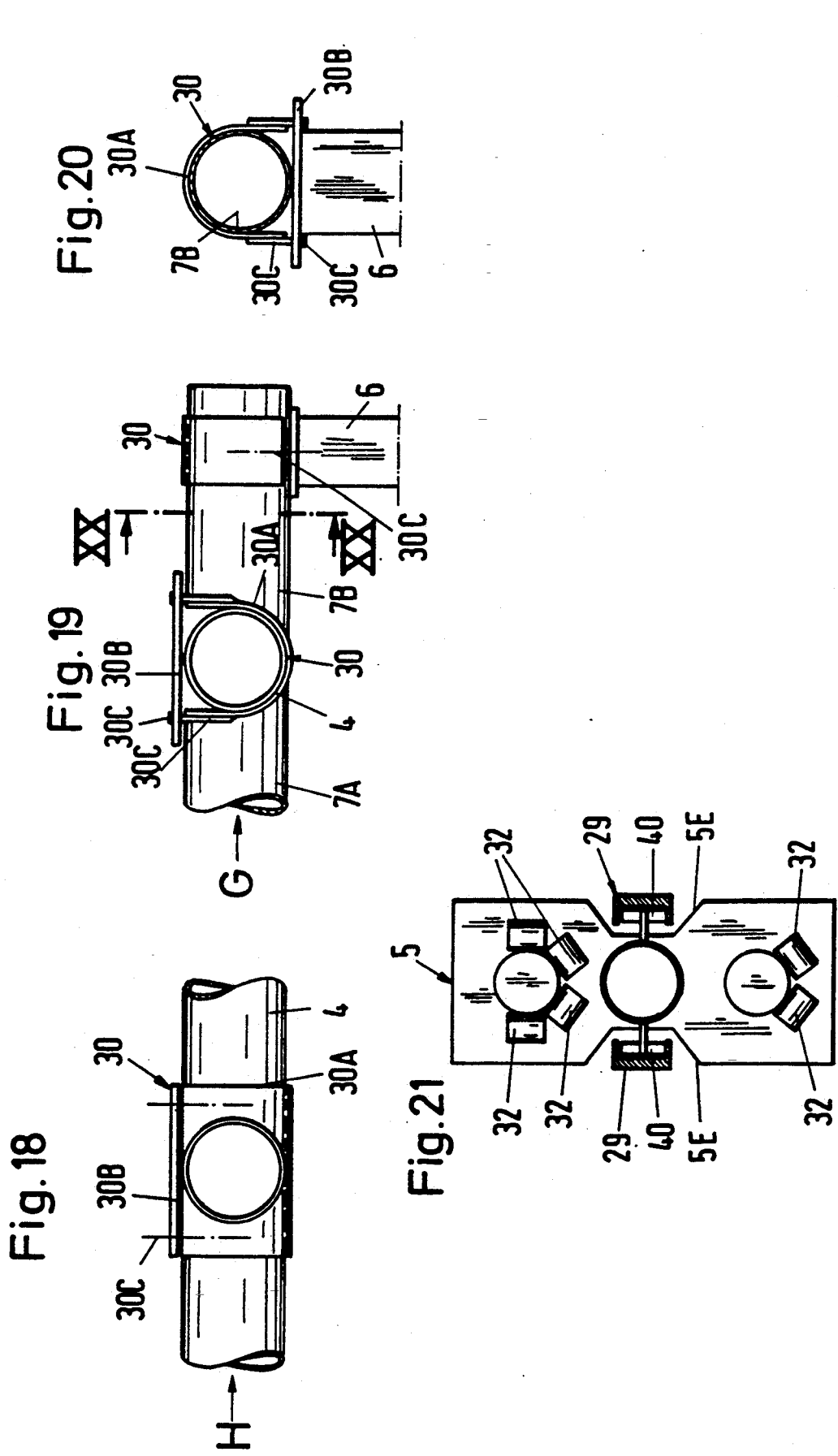

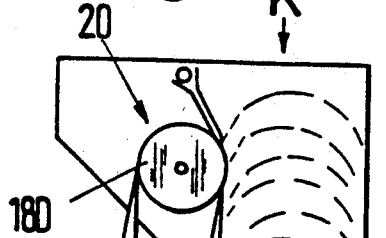
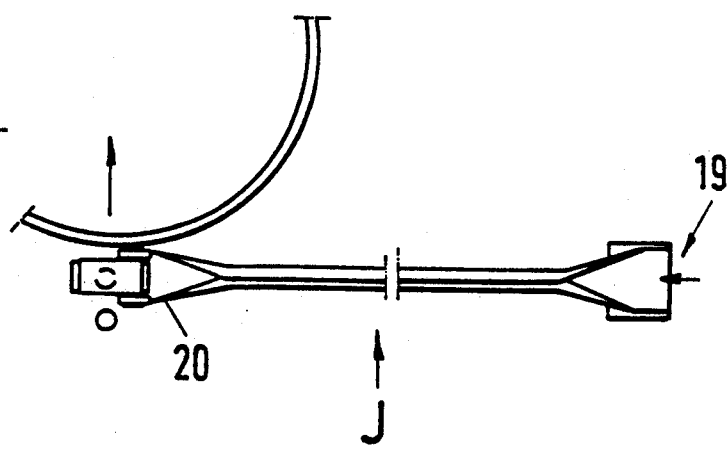
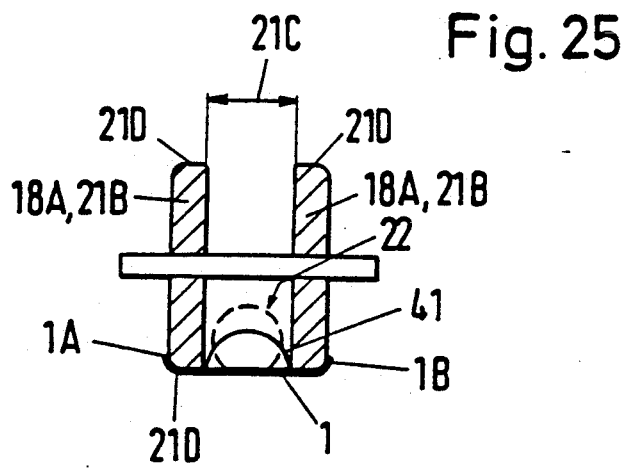
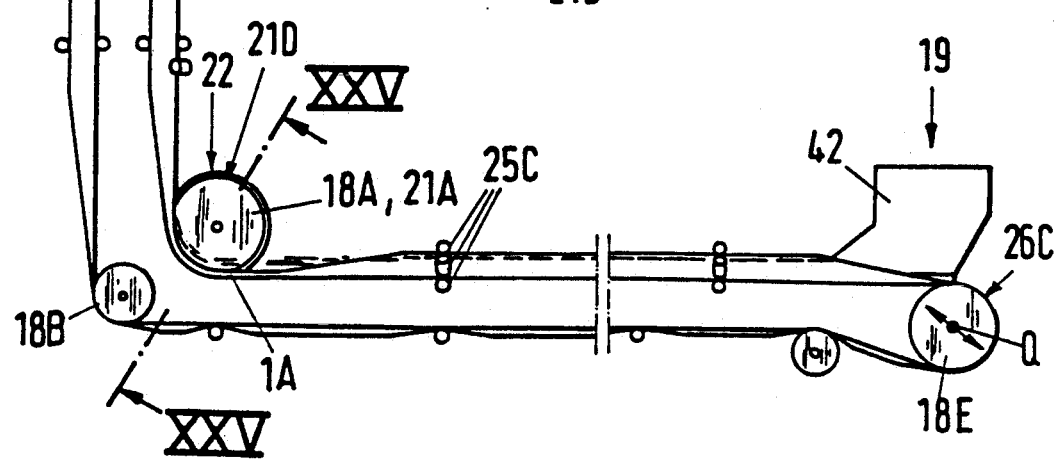

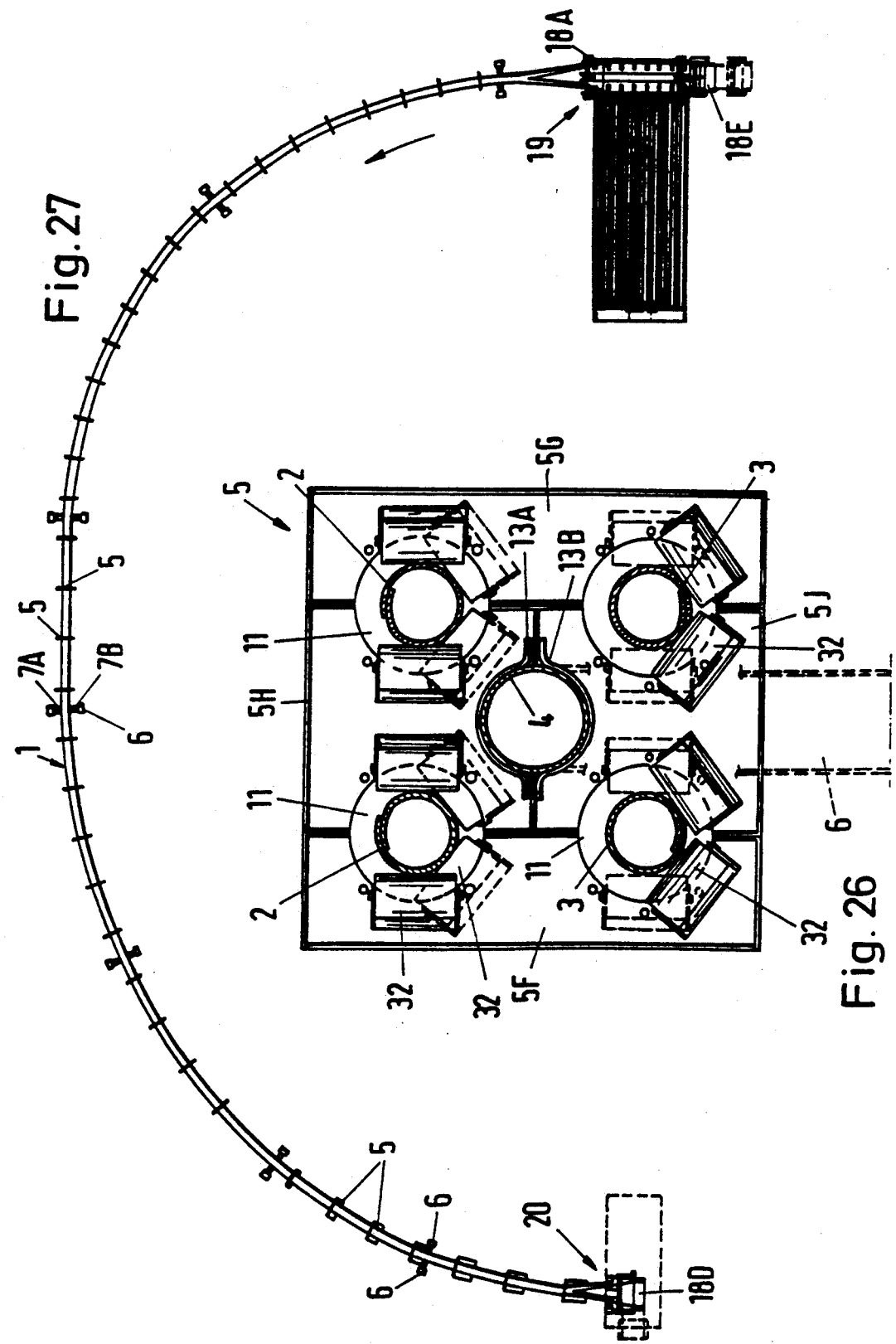

CLOSED BELT CONVEYOR ARRANGEMENT

TECHNICAL FIELD

The invention relates to a closed belt conveyor arrangement.

BACKGROUND OF THE INVENTION

It is known to use roller support frames in closed belt conveyor arrangements of this type as an essential part of the support structure of the conveyor arrangement. In the case of conveyor paths which extend level with the ground, the roller support frames have supports at their lower end by means of which they are anchored to a foundation. During inclined paths and other sections of the conveyor path in which supports are desired or possible only at comparatively great distances (from each other), so that not each individual roller support frame can be supported on the ground, the roller support frames are connected by means of longitudinal and diagonal struts to form a lattice tower-like structure which needs to be supported on the ground only at greater distances. Also in this case, the roller support frames are an essential part of the support structure of the conveyor arrangement.

These known closed belt conveyor arrangements have, among other things, the disadvantage that the construction and mounting cost of these arrangements is particularly great when the path of the conveyor changes in the horizontal or vertical direction. However, it is precisely the curving path which is one of the essential advantages of closed belt conveyor arrangements.

SUMMARY OF THE INVENTION

Based thereon, it is the task of the invention to create an improved support structure for a closed belt conveyor of this type, particularly to be able to utilize the curving path of closed belt conveyor arrangements of this type in a simplified manner.

Among other things, it is achieved by means of the invention that the conveyor arrangement may be constructed in accordance with the building block principle, i.e., that structural components which are specifically adapted to the respective curved path of the conveyor, which previously had to be planned in advance for this purpose, are not required. Moreover, the mounting of the conveyor arrangement is noticeably simplified. Also, the manufacturing and mounting costs for the form, guide and support elements of the portion of the conveyor belt which has been shaped into a tube is reduced. In all, the invention offers an extraordinarily flexible and adaptable conveyor arrangement to the respective application and in particular to the respective conveyor path. The individual structural components merely need to be assembled at the site in accordance with the conditions encountered there. This proves to be useful particularly if the conveyor path should change during the planning phase or during the later service phase.

Advantageous arrangements of the invention which are usable even independently of the basic concept of the message of the invention and particularly the usefulness of the conveyor arrangement in extreme cases of application, guarantee an improved transition between the closed and the open conveyor belt cross section, a simplified construction of the roller support frames, an extensive degree of independence from existing arrangements in the area of the loading and discharge stations, as well as an improved adjustability of the belt tension and a simple avoidance of running off track.

The previously mentioned structural components to be used in accordance with the invention are subjected with respect to their size, form, material selection and technical concept to no special exceptional conditions, so that the selection criteria known in the respective area of application can find unlimited application.

BRIEF DESCRIPTION OF THE DRAWINGS

Additional details, characteristics and advantages of the object of the invention result from the subsequent description of the accompanying drawing in which—for example—a preferred arrangement of a closed belt conveyor arrangement is shown. In the drawing, FIG. 1 shows a closed belt conveyor arrangement in (as seen in horizontal direction) sideview (view A in accordance with FIG. 2);

FIG. 2 shows the same closed belt conveyor as viewed from above (view B in accordance with FIG. 1);

FIG. 3 shows a sideview (view C according to FIG. 4) of a closed belt conveyor similar to FIGS. 1 and 2;

FIG. 4 shows a view from above (view D according to FIG. 3) of the same closed belt conveyor;

FIG. 8 shows an alternative arrangement of a roller support frame in frontal cross sectional view (cross section along the line VIII—VIII in accordance with FIG. 9);

FIG. 9 shows the same roller support frame in vertical cross section, however, the conveyor belt is left out (cross section along the line IX—IX);

FIG. 10 shows an additional alternative arrangement of a roller support frame in frontal cross section (cross section along the line X—X in accordance with FIG. 11);

FIG. 11 shows a vertical cross section of the same roller support frame while the conveyor belt is left out (cross section along the line XI—XI in accordance with FIG. 10);

FIG. 12 shows a frontal view of the support portion (view E in accordance with FIG. 13) of another alternative arrangement of the roller support frame;

FIG. 14 shows a developed view of the same support portion;

FIG. 15 shows a rib of the same support portion;

FIG. 16 shows a clamp of the same support portion in axial as well as radial view;

FIG. 17 shows an alternative arrangement of a support portion of the invention in the manner of illustration corresponding to FIG. 12;

FIG. 18 shows a connection area of the support structure (view G in accordance with FIG. 19) of a closed belt conveyor arrangement;

FIG. 19 shows a view turned by 90° of the same connection area (viewed in accordance with FIG. 18);

FIG. 20 shows a cross section view (cross section along the line XX—XX in accordance with FIG. 19) of the same connection area;

FIG. 21 shows a frontal cross section of an additional roller support frame with axially movable support profile beam of a closed belt conveyor arrangement of the invention;

FIG. 23 shows a sideview (view J in accordance with FIG. 24) of another alternative arrangement of a closed belt conveyor arrangement of the invention in schematic illustration while omitting a support profile beam;

FIG. 24 shows a view from above (view K in accordance with FIG. 23) of the closed belt conveyor arrangement in accordance with FIG. 23 and FIG. 25 shows an axial cross section through a deflection roller pair (cross section along the line XV—XV in accordance with FIG. 22 or 23) of a closed FIG. 18 shows a connection area of the support structure (view G in accordance with FIG. 19) of a closed belt conveyor arrangement;

FIG. 19 shows a view turned by 90° of the same connection area (viewed in accordance with FIG. 18);

FIG. 20 shows a cross section view (cross section along the line XX—XX in accordance with FIG. 19) of the same connection area;

FIG. 21 shows a frontal cross section of an additional roller support frame with axially movable support profile beam of a closed belt conveyor arrangement of the invention;

FIG. 23 shows a sideview (view J in accordance with FIG. 24) of another alternative arrangement of a closed belt conveyor arrangement of the invention in schematic illustration while omitting a support profile beam;

FIG. 24 shows a view from above (view K in accordance with FIG. 23) of the closed belt conveyor arrangement in accordance with FIG. 23 and FIG. 25 shows an axial cross section through a deflection roller pair (cross section along the line XV—XV in accordance with FIG. 22 or 23) of a closed belt conveyor arrangement in accordance with FIGS. 22 or 23;

FIG. 26 shows an alternative arrangement of the invention in which several conveyor belts are carried by a single support profile beam;

FIG. 27 shows a view from above a closed belt conveyor arrangement in which the conveyor path is curved;

DESCRIPTION OF PREFERRED EMBODIMENTS

Figure 6:
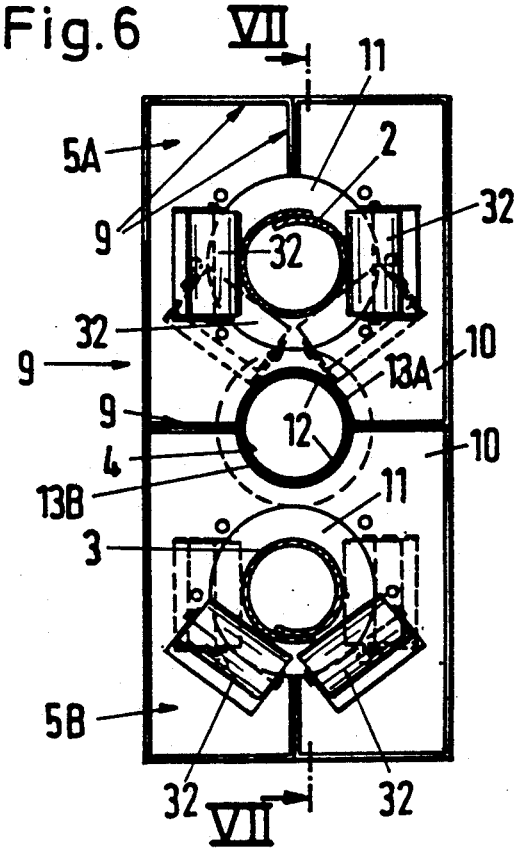
FIG. 6 shows a front view of a roller support frame (cross section view along the line VI—VI, in accordance with FIG. 7) of a closed belt conveyor arrangement.
Figure 7:
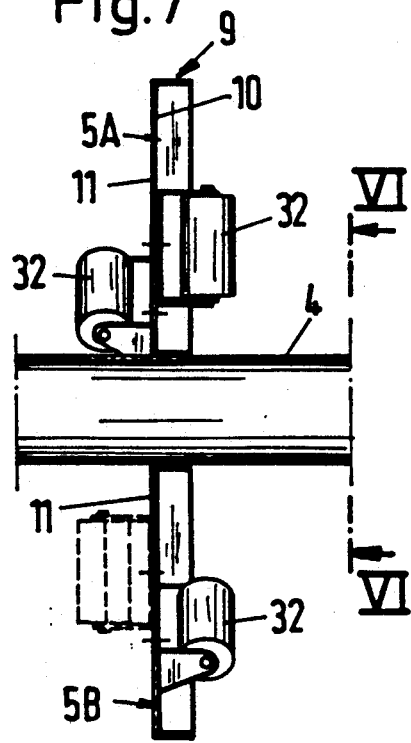
FIG. 7 shows a vertical cross section of the same roller support frame while the conveyor belt is left out (cross section along the line VII—VII in accordance with FIG. 6)

As can be seen from FIGS. 1 and 2, the conveyor (1) of a closed belt conveyor arrangement of the invention consists of an endless conveyor belt (see also FIGS. 6, 8 and 10 as well as 22 and 23) deflected at the end of the conveyor path (a), tube-like, separated lengthwise, forming a hoist belt (2) and a return idle belt (3). The hoist belt, formed into a tube, is surrounded by a roller support frame (5) at more or less regular intervals—as viewed in the direction of the conveyor path. As a rule, at the roller support frame (5), several rollers (32) are attached and arranged in such a way, that they maintain the shape of the conveyor belt (1) or carry it. For this purpose, at both shaft ends, pivotable rollers (32), as well as rollers with cantilever shafts can be used. Furthermore, the roller support frames are explained in greater detail below.

Between the hoist belt (2) and the idle belt (3), a support profile beam (4) is provided. The latter is essentially arranged centrally between the hoist and the return strands and extends essentially parallel to same. The support profile beam is elongated and extends essentially across the entire conveyor path (a). The support profile beam (4) may basically be in the form of a single piece element across its entire length, which extends across the entire conveyor path (a). Preferably, the support profile beam consist of several partial sections which are screwed together, welded together or are connected with each other in any other way either rigid or movable. The support profile beam (4) exactly follows the course of the conveyor path, i.e. it follows or precedes each change in direction of the conveyor path. In the example in accordance with FIG. 1, the conveyor path changes only in a vertical plane however not in an horizontal flat—as can be seen from FIG. 2. However, in the place of this very simple case, the conveyor path may also change its direction—as viewed from above—between the loading station (19) and the discharge station (20), particularly several times. In the place of a change in direction of the conveyor path in two flats, naturally also a change in an horizontal flat is possible. In all cases, the support profile beam follows or precedes the exact path of the conveyor path.

In order to be able to carry out changes in the direction of the conveyor path with the support profile beam, several paths are open. For example, the support profile beam may be bent in accordance with the course of the conveyor path. However, it may also be formed as a polygonal course from inherently straight support profile beam sections. Mixed constructions are also possible.

As can be seen further from FIGS. 1 and 2, the conveyor belt (1)—in the area of the deflection stations (26A and 26B or 26C)—is not formed into a tube at the ends of the conveyor path (a) and possibly also at deflection points located between these ends, as—for example—in the area of the deflection rollers (18A and 18B), but it is elongated in its cross section, particularly flat or even like a trough, which will be further explained in connection with FIGS. 22 and 23.

In the loading station (19) which, like the discharge station (20), may be surrounded entirely or partially by protective grilles, there exists the possibility in the example of providing a ramp from which the hoistway, maintained in a spread form (flat or troughed) by means of expanding rollers (25A, 25B) is loaded.

Furthermore, from the FIGS. 1 and 2 one can see that at the end of the loading station (19), which is removed from the deflection station (26A), deflection rollers (18A) are provided which consist of a pair of rolling wheels (21A and 21B), which in axial direction are at a distance from each other. They assume a double function by deflecting the hoistway (2) by a certain angle (here by 30°) and, furthermore, cause or permit the transition of the hoistway from its stretched flat cross section form into its tubelike cross section form.

The rolling wheels (21A, 21B) are mounted to rotate on roller support elements (17), which also carry a deflection roller pair or a deflection roller (18B) by means of which the deflection of the return strand (3) is brought about at the transition between the loading station (19) and the inclined path of the conveyor belt.

The roller support element (17) is in the form of a rotating pinion, which is mounted to pivot and held about an axis (16), arranged between the two deflection rollers (18A and 18B) and extending approximately in horizontal direction. This axis (16) represents simultaneously the axis of a link joint (15), by means of which a profile section (4A) is connected with a profile section (4B) of the support profile beam (4). In this way, a change in the incline of the inclined path of the conveyor belt, as shown in FIG. 1, can be achieved without problems.

The longitudinal tension of the conveyor belt (1) is controlled in that the deflection roller (18E) can be telescopically adjusted at the deflection station (26A) in the direction of the longitudinal path of the profile section (4B) of the support profile beam (4), as can be gathered in detail from the FIGS. 3 and 4.

The entire closed belt conveyor arrangement, in accordance with FIGS. 1 and 2, is supported on the ground merely in the area of the loading station (19) and of the discharge station (20) by means of three or two supports (6) arranged in pairs. Between the loading station and the discharge station, merely a single pair of supports (6) is provided which engages the support profile beam (4) via approximately horizontally extending supports (7), so that the load rests directly on the support profile beam (4).

As can be gathered in detail from the FIGS. 3 and 4, the profile section (4B) of the support profile beam (4) is in the form of a tube which is hollow on the inside and which serves as the cylinder (27A) of a piston/cylinder arrangement (27). Into the open end of the profile section (4B), which is on the right in the drawing, a piston (27B) is pushed which—together with the cylinder (27A) and the respective fluid connections and valves, which are all known, represents the piston/cylinder arrangement (27). At the free end of the piston (27B), which protrudes from the cylinder (27A), a support bracket (28) is attached, which is fork like in appearance and which at its two fork ends has bearings for the pivot bearing of the deflection roller (18E).

In order to be able to control the conveyor course it is provided, as known, that the angle of the axis of the deflection rollers (18E) can be adjusted with respect to the general path direction of the conveyor belt. This takes place in that the central part of the support bracket (28) can be pivoted about an axis (31) of several degrees by means of set screws (33) with respect to a plate (34) which is rigidly attached to the free end of the piston (27B), wherein the right or the left one of the set screws (33) are alternately set in opposite directions.

Figure 5:
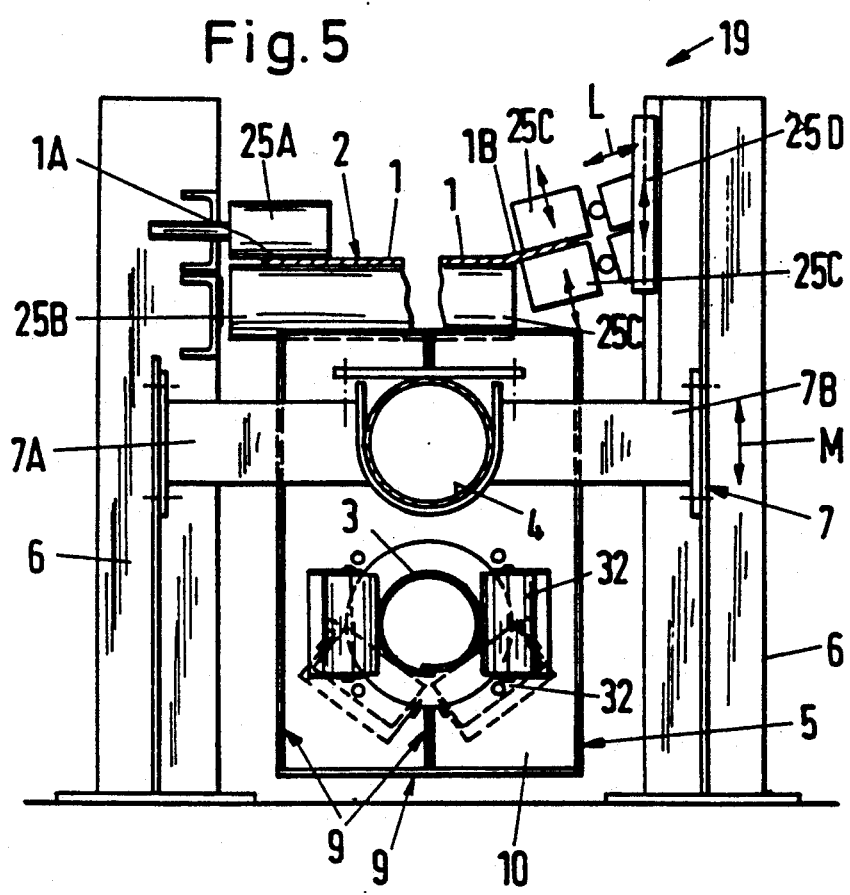
FIG. 5 shows a vertical cross section through the loading station (19) of the same closed belt conveyor (cross section along the line V—V in accordance with FIG. 3)

From FIG. 5 it follows that the expansion of the conveyor belt (1) in the area of the loading station (19) can take place, for example, in that the edge areas (1A and 1B) are held down from above by means of expanding rollers, while a roll, extending across the entire belt width serves as an expanding roller (25B) which simultaneously serves as a belt support from below. Of this, in FIG. 5, only the left half of the image is shown. The expanding rollers (25A, 25B), are mounted only on one side, so that in the middle of the belt the loading area remains free. Alternatively, the conveyor belt (1), as shown in FIG. 5 on the right, the trough form can be maintained in expanded form, for which purpose expanding rollers (25C) serve as cantilever rollers. As indicated by the double arrows attached to them, they may be pivoted in their incline with respect to a vertically adjustable expanding roller holder (25D) about an essentially horizontal axis. Furthermore, it is possible to move axially in the direction of the double arrow (L).

As can furthermore be seen from FIG. 5, between the hoistway (2) and the return strand (3) a support profile beam (4) extends which is in the form of a round tube. This beam, in turn, has a roller support frame (5) for the return strand (3). Similar roller support frames will be further explained in connection with FIGS. 6 to 17. The support profile beam (4), in turn, is supported by approximately horizontally extending profiled sections (7A and 7B) of a support (7) and vertical supports (6). For this purpose, the profile sections (7A and 7B), by means of a connection clamp (30), as will be explained in connection with FIG. 18 to 20, are rigid and are connected with the support profile beam (4) in the flat containing the axis of the support profile beam (4). The merely indicated attachment between the profile sections (7A and 7B) and the vertical support piece (6) may be rigid or, for example, may be displaceable in vertical direction. This is symbolized by the double arrow (M).

As can be gathered from FIGS. 6 to 17, a roller support frame may consist of several sections. The one possibly preferable section has for the hoistway as well as for the return strand a roller support frame (5A and 5B), and that these two are connected with each other together with the support profile beam (4) in such a way, that they are simultaneously clamped onto the support profile beam (4). This possibility is shown in the FIGS. 6 and 7, as well as 10 and 11. It is also possible to attach the support profile frames (5A or 5B) for the hoistway or the return strand at various points along the support profile beam (4). For this purpose the one half (13B) of a clamp separates, whereas the other half (13A) is rigidly connected to the roller support frame (5A or 5B). For example, the clamp parts are screwed together and apply the clamping force for attaching the roller support frame to the support profile beam (FIGS. 8 and 9).

It is possible at any time to rigidly attach all roller support frames at a rigid, preferably right angle to the support profile beam (4).

The construction and assembly of the roller support frame (5) is simply conceived and can be easily understood in detail from FIGS. 12 to 17. In this example, a flat material (10), such as sheet metal, is used which is provided, while still in the flat state, with circular recesses (11) for the conveyor belt and 12 for the support profile beam. The outline to be fired or stamped from a larger plate to be cut out, represents a developed view

(38) of the support profile beam to be produced. In the example in accordance with FIGS. 12 to 17, in contrast to the example in accordance with FIGS. 6 to 11, the division of the roller support frame is undertaken in such a way, that it is divided into two support profile frame parts (5C and 5C) along a flat (8), where the latter is jointly held by the hoistway or the return strand and the support profile beam (FIGS. 12 to 14) or by the hoistway and the return strand, as well as the support profile frame. However, the separation plane (8) is not necessarily at the centers of the closed belt and of the support profile beam and it also does not necessarily have to be flat. It must merely make it possible to divide the roller support frame (5) in such a way that the two roller support frame sections can be placed during mounting or dismounting in such a way, that they subsequently can clamp the support profile beam (4) between themselves and can receive the closed belt.

As one can see from FIG. 14, for the production of the roller support frame, at least one portion of the edge strips of the developed view (38) are mounted on the sides. These elements mounted on the sides (36 and 37) are welded together at the common contact edges. The weld-in ribs (35) serve as additional reinforcement, which offer reinforcement not only at the outer edge of the roller support frame but also in the direction towards the surface center and which also have holes (35A) which can accommodate connection screws (indicated in FIGS. 12 and 17) for the paired connection of the roller support frame sections (5C and 5D).

The previously mentioned separated clamps (13A, 13B) are shown in greater detail in FIG. 16 and, due to their simplicity of form, require no further explanation. In the example according to FIGS. 12 and 17, both clamp sections (13A and 13B) (the latter are not individually shown since the roller support frame section (5D) is a mirror-image to the section (5C)) are welded at a front edge with the flat material (10), so that the side mounted ends are still movable for the clamping screws (13C). Welded reinforcement ribs (14) reinforce the roller support frame in the area of the support profile beam attachment. They can possibly also serve as individual attachment parts for the clamps (13A or 13B), so that these do not need to be welded with one longitudinal seam or several longitudinal seams with the flat material (10).

The support of the support profile beam (4) can be especially simply achieved on site with the structural components shown in FIGS. 18 to 20. The profile sections (7A and 7B), already mentioned in connection with FIG. 5, are connected with each other by means of a connection clamp (30), which consists of a semicircular bent flat material (30A), a level flat material (30B) and of fourthread bolts (30C) screwed onto the flat material (30A). The connection clamp (30A, 30B) grips around the support profile beam (4) and wherein a sufficient clamping force is produced by means of the screw bolts (30C) and corresponding nuts. The somewhat semicircular bent flat material (30A) is welded with profile sections (7A and 7B) to the form fitted front ends. The same type of clamps can also be used for the attachment of the profile sections (7A and 7B) to the supports (6) on their upper front ends, wherein the clamp construction permits a variable distance between the support profile beam (4) and the vertical supports (6).

As can be gathered from FIG. 21, a roller support frame (5)—not shown in greater detail—can be provided near the support profile beam (4) with edge recesses (5E) which make it possible to arrange guide rails (29) relatively close to the support profile beam (4). Guide elements, attached at the support profile beam (4) or the roller support frame (5), particularly pivotable guide rollers (40), are adapted to the guide rail (29) in such a way, that the support profile beam (4) is displaceable in its longitudinal direction and—at the same time—can be carried. Such guidance and adjustability, particularly in the area of the discharge station, can be used to achieve discharge points which are at a distance to each other in the direction of advance. For this purpose, the entire conveyor belt can be moved in the direction of advance. However, it is also conceivable, in the case of a conveyor path which changes its direction several times, to provide movable link joints between the front ends of individual sections of the support profile beam (4) and thus to bring about a change from the normal conveyor path, for example, with articulated pipes or tubes, as provided, for example, on concrete supply pumps. Also for such purposes, guide rails of the type shown in FIG. 21 can be useful. However, in no case is it required to provide the edge recesses (5E) because it is basically also conceivable to place the guide elements (40) further towards the outside with respect to the center of the support profile beam.

Figure 22:
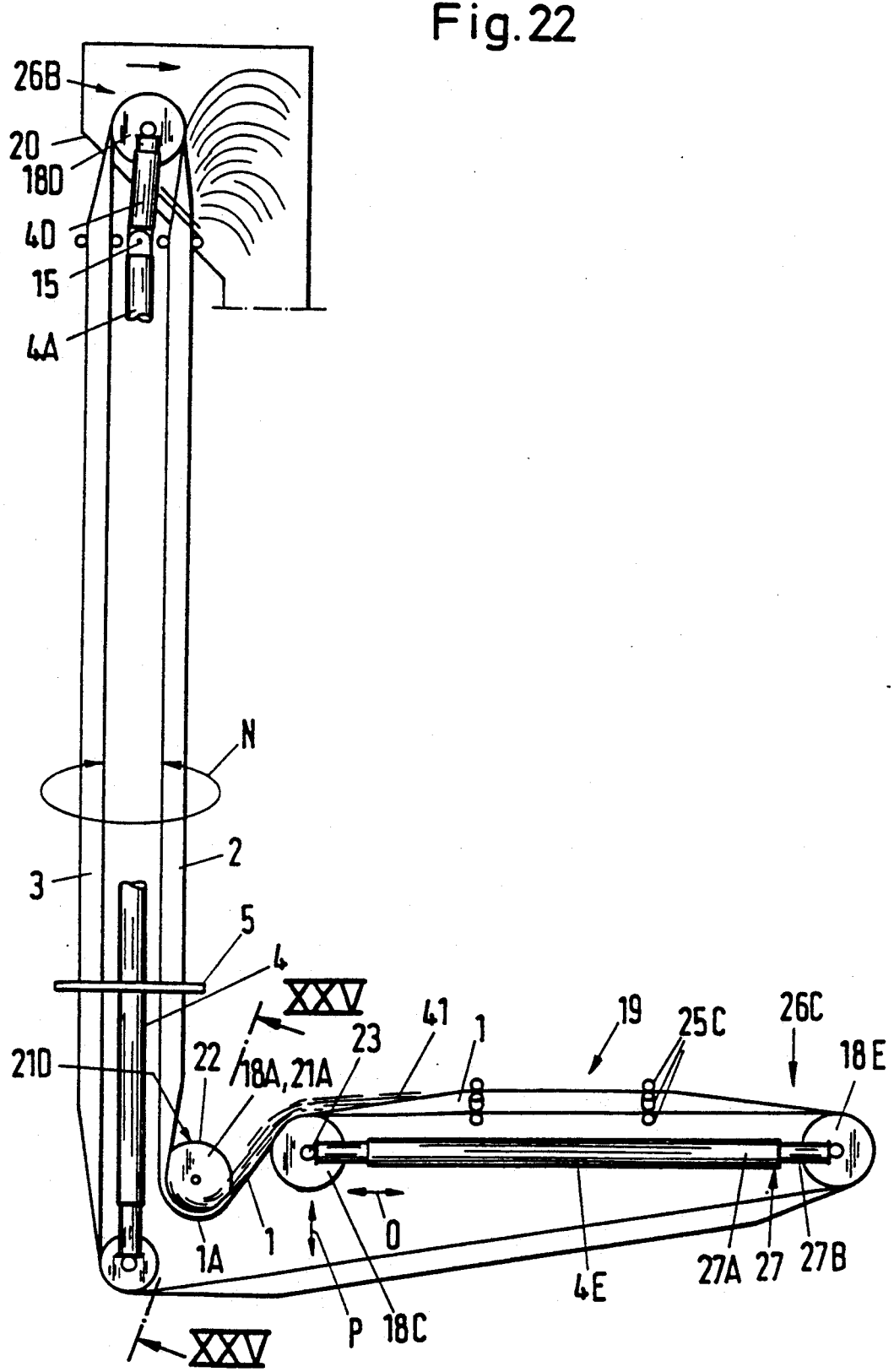
FIG. 22 shows a schematic sideview of another arrangement of a closed belt conveyor arrangement.

The many applications of a closed belt conveyor arrangement of the invention can be gathered from the FIGS. 22 to 25:

In accordance with FIG. 22, the support profile beam (4) extends—in the manner already explained in detail above—across the entire actual conveyor path up to the discharge station (20) where a tipping of the support profile beam (4) and thus an adjustability of the discharge parabola is achieved by means of a connection joint (15) which movably connects the profile section (4A) and the pivotable end section (4D) of the support profile beam (4) with each other. As indicated by the double arrow (N), the closed belt conveyor can be rotated about the longitudinal axis formed in front of the support profile beam (4), so that various discharge points can be reached. On the one hand, this can be realized in that the roller support frames are clamped on the support profile beam (4) in a manner wherein they are twisted toward each other. However, it is also possible and of advantage for the ease of twisting, when the support profile beam (4) can be twisted in itself, wherein—for example—adjacent profile sections are arranged in such a way, that they are twisted toward each other.

In the area of the loading station (19), a special belt guidance is provided, in which the support profile beam (4) no longer takes part. In order to achieve an essentially S-shaped belt course and to make possible a particularly advantageous transition from an essentially horizontally extending loading path into a somewhat vertically extending conveyor path, an appropriately arranged additional deflection roller (18C) is provided which, as indicated by the double arrows (0 and P), can be moved vertically as well as horizontally. Between the deflection rollers (18C) and the deflection roller (18E) at the deflection station (26C), a telescoping device is provided which may be in the form of a piston/cylinder arrangement (27, 27A, 27B), as already described in connection with FIGS. 1 to 4. This telescoping device may in turn be in the form of a support profile beam section (4E) which has roller support frames in the area of the loading station (19) which, for the sake of simplicity, are not shown individually in the drawing.

The deflection rollers (18A) are constructed in a similar way as already described in connection with FIGS. 1 to 4, with, however, the distinction that the lateral edge areas (1A and 1B) of the conveyor belt (1), in the otherwise expanded state of the conveyor belt, may be bent over in the direction towards the axis of the rolling wheels (21A and 21B) of the deflection rollers (18A). For this purpose, rounded running surfaces (21D) are provided which reduce the danger of belt damage. As is shown in FIG. 25, the material delivered (41) loaded in the horizontal area of the loading station is discharged by means of the deflection roller (18C) into the gap (21C) between the rolling wheels (21A and 21B) so that from there, it can be flung upwardly into the vertical conveyor path and can be taken along by the conveyor belt which is closed into a tube. The cross section of the closed conveyor belt is indicated as a dotted circle in FIG. 25.

An arrangement similar to the one in FIG. 22 is shown in FIGS. 23 and 24, wherein—for the sake of clarity—the support profile beam (4) is left out. However, it is also conceivable to use such closed belt conveyor arrangements—as shown—without support profile beams.

In the arrangement according to FIG. 23, as a special feature, a known hopper (42) is provided at the end of the conveyor path, wherein the belt tension is achieved in that the axis of the deflection roller (18E) is arranged in a slightly downwardly inclined direction by means of a telescoping device or the like.

According to an alternative arrangement of the invention (FIG. 26), it is also possible that several conveyor belts are carried by a single support profile beam. In the example shown, two hoistways (2) and two return strands (3) are provided. Other than that, this example corresponds to the one according to FIGS. 6 and 7, wherein, however, the division of the roller support frame (5) into four roller support frame sections (5E, 5G, 5H and 5J) is provided, wherein the parts (5H and 5J) clamp the support profile beam (4) between themselves while the parts (5F and 5G) correspond to a separation of the two strands of a conveyor belt as described in analogous manner in connection with FIG. 17.

An essentially central arrangement of the support profile beam between two or more closed belt strands of the conveyor arrangement is the preferred arrangement of the invention.

The two strands of a conveyor belt may be arranged vertically above each other as well as horizontally side by side and may assume any desired intermediate positions. In particular, during the course of the conveyor path a spiral twisting can be undertaken, for example, in order to achieve a vertical stacking of the strands from an horizontal juxtaposition.

Otherwise, it has no bearing on the invention whether the conveyor belt is a level conveyor belt which must first be brought into tube form or must be maintained thus or whether a so-called naturally formed belt is used which has been manufactured in tube form with a longitudinal slit. The latter are particularly advantageous in connection with the invention.

FIG. 27 (in contrast to FIG. 2) also represents a view from above of a closed belt conveyor arrangement of the invention, wherein the conveyor path (as viewed from above) is curved (and not straight as in FIG. 2).

Figure 28:
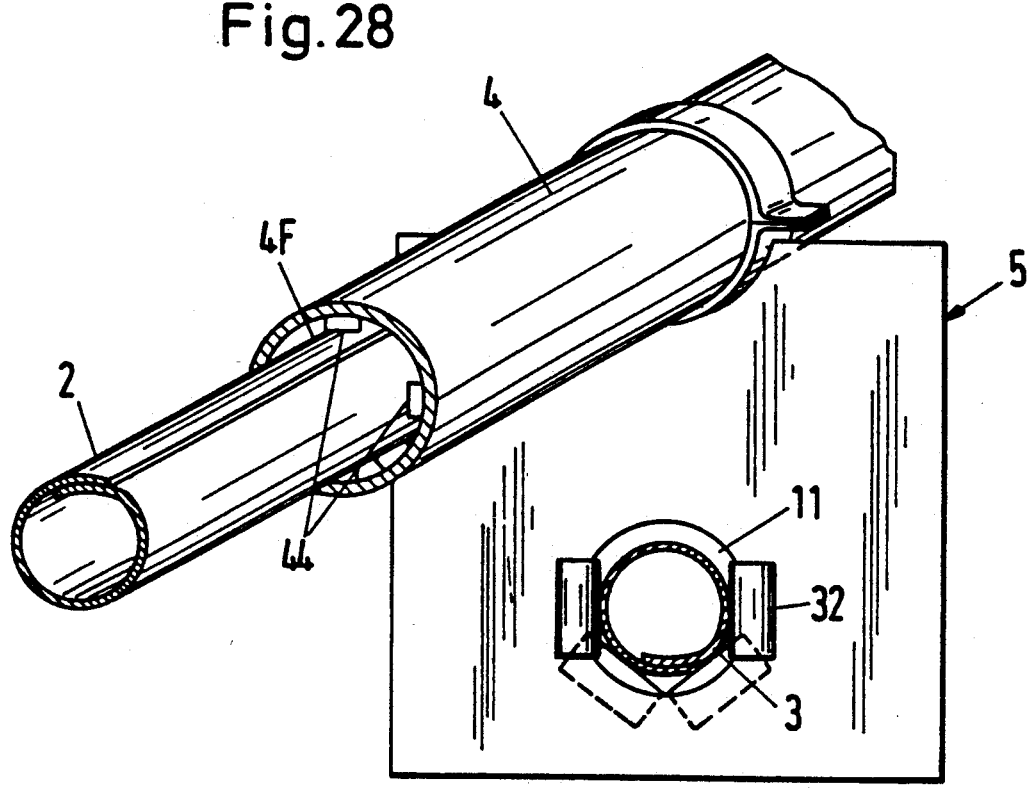
FIG. 28 shows an alternative arrangement of a closed belt conveyor arrangement in which a support profile beam serves simultaneously as a support, guidance, and form preserving element.
Figure 29:
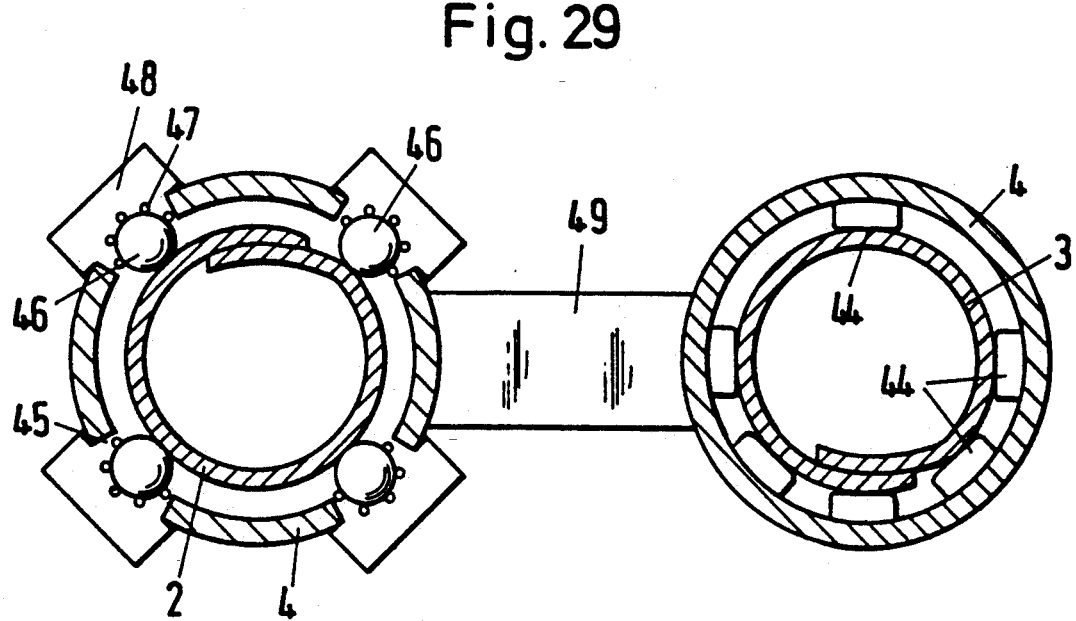
FIG. 29 shows an alternative arrangement of the closed belt conveyor arrangement of FIG. 28 in which two support profile beams are connected with each other.

An entirely different alternative arrangement of a closed belt conveyor arrangement is shown in FIG. 28 in schematic form and, in sections, in perspective view which, in part, is shown in open view. In this arrangement, the support profile beam (4) in the form of a round pipe serves simultaneously as a support, guidance, and form preserving element for one of the two closed belt strands (here for the hoistway (2)). At the interior wall of the hollow space (4F) of the support profile beam (4) strip elements, oriented in the direction of advance, are attached as glide elements and provided with a glide coating (44), which permit a low friction gliding of the closed belt. In the place of a glide coating (44), roller elements (46) may be provided, as described in connection with FIG. 29, which, for example, grip through openings (45) in the wall of the support profile beam (4), have a spherical form and are arranged at the points provided for this purpose on the support profile beam (4). Such roller elements, which in turn, are held and mounted to rotate by means of roll elements (47) in a low friction manner inside a cage (48), are known. The cages (48) can be mounted relatively simply to the support profile beam (4) from the outside.

As is also shown in FIG. 28, roller support frames (5) for one or several closed belt strands can be attached at the support profile beam (4). In FIG. 28, for example, a roller support frame in accordance with FIGS. and 9 is shown for this purpose.

As an alternative to the arrangement according to FIG. 28, additional closed belt strands can be smoothly guided in one additional support profile beam (4) each and can be maintained in their form and supported. This is indicated purely schematically in FIG. 29, wherein the two support profile beams (4) are connected with each other by means of a connection element (49).

Figures 30, 31:
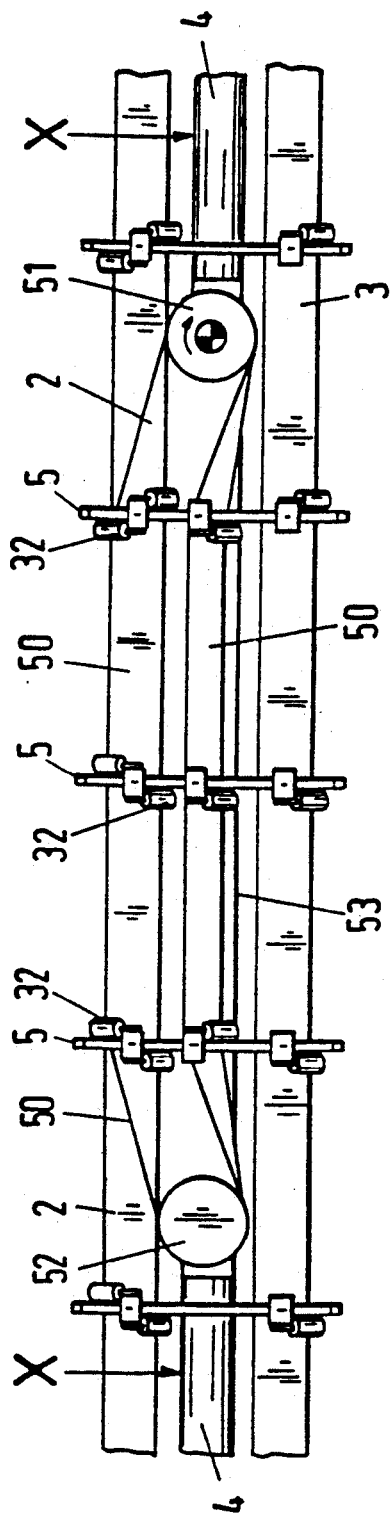
FIG. 30 shows a closed belt conveyor arrangement in which a sectional side view of an intermediate drive station is provided.
FIG. 31 shows a view taken approximately along line X—X in FIG. 30.

Finally, as can be seen from FIGS. 30 and 31, a closed belt conveyor arrangement of the invention may also be provided with an intermediate drive in which an individually driven drive belt (50) in one section winds around the belt strand to be driven, particularly under the pressure of appropriate rollers, while in the remaining section of the endless, twice deflected drive belt, same has essentially a straight cross section. Such intermediate drives are known from the German Utility Model (Utility Model Application G 89 15 255.7) in connection with the FIG. 9 contained therein. The deflection rollers (51 and 52) for the intermediate drive belt (50) can—in the case of the present invention—be arranged and held in a particularly favorable manner, wherein they are attached to the support profile beam (4). On the one hand, this may be achieved in that the support elements, rotating and driving and carrying the deflection rollers (51 and 52), are attached in any desired manner to the support profile beam (4). However, it is particularly space and weight saving when, as shown in FIG. 31, the deflection rollers are supported in one or several support frames (53), which are inserted as a part of the support structure between straight pieces of the support profile beam (4). As can be gathered from FIG. 30, representing a section of a side view of an intermediate drive station of the invention, support roller frames (5) can be attached to the support frame (53) in an appropriate manner and may carry suitable rollers, which maintain the necessary pressure of the drive belt (50) on the closed belt strand wound around it along a partial course.

Figure 32:
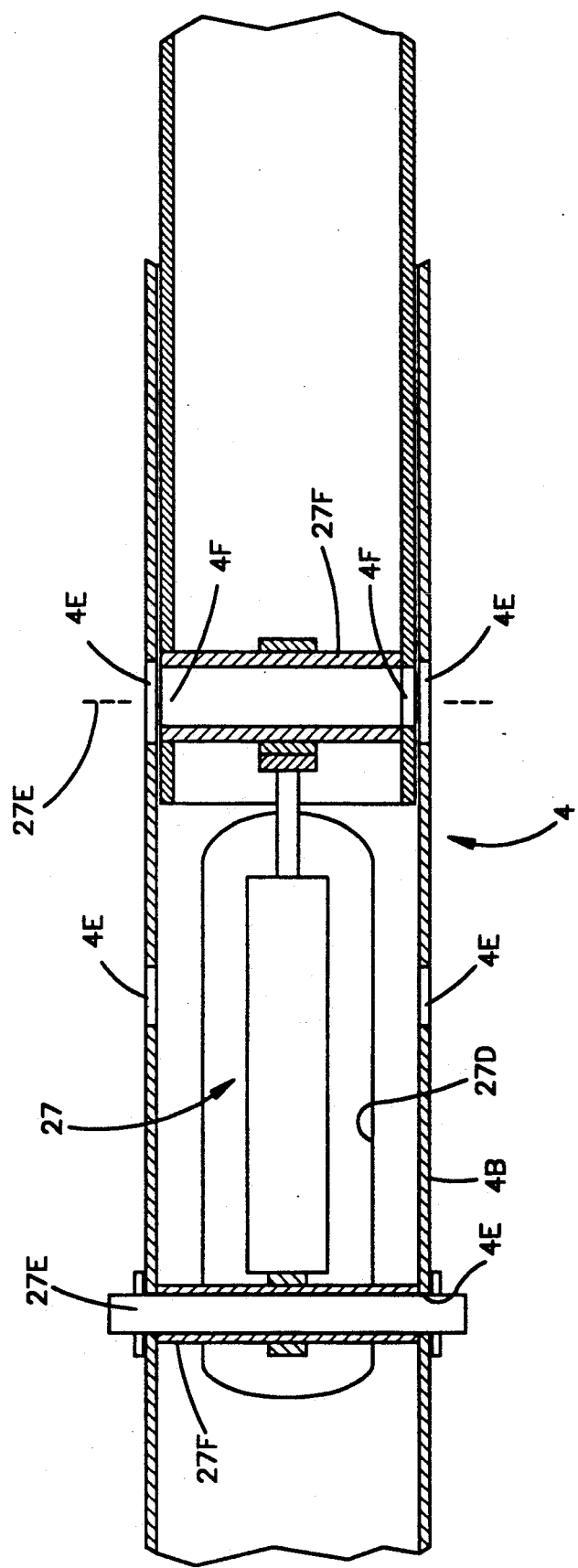
FIG. 32 shows an axial longitudinal section through a conveyor belt stretching device.

FIG. 32 illustrates an axial longitudinal section through a conveyor belt stretching device (piston/cylinder device 27) that can be utilized in an advantageous manner as an alternative to the stretching device illustrated in FIG. 3 and 4. According to FIG. 32, a conventional hydraulic stretching device is utilized as piston/cylinder device (27) which can be inserted into the profile section (4B) through a window (27D). The profile section (4B) is provided with several pairs of bores (4E) along its longitudinal extent through which bolts (27E) that serve as an abutment for the piston/cylinder device (27) can be inserted.

The profile section (4A) of the profiled support beam (4) is arranged with its free end area in a longitudinally movable manner in the opposing end area of the profile section (4B) and provided with a pair of bores (4F) transverse to its axial direction between which a distance tube (27F) as second abutment for the piston/cylinder device (27) is arranged. The pairs of bores (4E and 4F) can be aligned with each other by mutual displacement of the profile sections (4A and 4B). This is illustrated in the drawings. This relative position can, if necessary, be secured by a further bolt (27E) (not separately shown in the drawings). A piston/cylinder device with comparatively short lift can be utilized for longer conveyor belt facilities with substantial stretching distances (3 meters are no rarity). Once the full lift has been reached, the obtained relative position between the profile sections (4A and 4B) is at first secured by insertion of a bolt (27E). Then the other bolt (27E) that serves as abutment for the piston/cylinder device (27) can be removed and the piston rod of the piston/cylinder device can again be inserted, which means that the cylinder is moving since the piston rod is fixed. Towards the end of the lift, a new alignment position of the pairs of bores (4E) must be determined in order to insert the bolt (27E) anew, so that the cylinder can again brace itself on the profile section (4B) and the stretching process can be continued—after removal of the bolt on the side of the piston rod. The positioning of the piston/cylinder device (27) in regard to the cross section of the profiled support beam (4) can, for example, be secured by the distance tubes (27F).

We claim:

1. A closed belt conveyor arrangement for transporting material along a conveyor path, the closed belt conveyor arrangement comprising:
   a tube-shaped endless conveyor belt deflected at the ends of the conveyor path and forming a hoistway (2) and a return strand (3);
   a plurality of roller elements for guiding the tube-shaped conveyor belt along the conveyor path; and
   a support structure for supporting the conveyor belt and the plurality of roller elements, the support structure including (i) an elongated support profile beam (4) extending parallel to the hoistway and the return strand and essentially along the entire conveyor path and for bearing the load of the conveyor belt and material transported therewith, (ii) supports (6, 7) attached directly to the support profile beam and for supporting the support profile beam (4), and (iii) a plurality of roller support frames (5) attached independently of the supports to the support profile beam and for supporting the plurality of roller elements;
   the support profile beam being the only structural supporting element extending between the roller support frames along the conveyor path and bearing the load of the conveyor belt and the material transported therewith, the support profile beam being appropriately turned in accordance with course of the conveyor path to define the exact course of the conveyor path in all vertical and horizontal directions of the conveyor path.

2. An arrangement in accordance with claims 1 further including means for (i) clamping a roller support frame (5A) associated with the hoistway (2) to the support profile beam (4) and (ii) clamping another roller support frame (5B) associated with the return strand (3) to the support profile beam.

3. An arrangement in accordance with claim 1 wherein the support profile beam (4) is a pipe.

4. An arrangement in accordance with claim 1 wherein the support profile beam (4) is a round pipe.

5. An arrangement in accordance with claim 1 wherein each roller support frame (5; 5A, 5B; 5C, 5D) has frame sections (9) and a flat section (10), such as a sheet metal, essentially surrounded by the frame sections, the flat section defining recesses (11) to enable complete or partial gripping around the hoistway (2) or the return strand (3) as the case may be.

6. An arrangement in accordance with claim 1 wherein each roller support frame (5; 5A, 5B; 5C, 5D) has frame sections (9) and a flat section (10), such as a sheet metal, essentially surrounded by the frame sections, the flat section (10) defining at least one recess (12) to enable complete or partial gripping around the support profile beam (4).

7. An arrangement in accordance with claim 6 further comprising clamps (13A, 13B) for attaching the roller support frames (5A, 5B; 5C, 5D) to the support profile beam (4).

8. An arrangement in accordance with claim 7 wherein at least one of the clamps (13A, 13B) is attached at the edge of the recess (12) for the support profile beam (4).

9. An arrangement in accordance with claim 8 further comprising reinforcement ribs (14) disposed between the clamps (13A or 13B) and the flat section (10).

10. An arrangement in accordance with claim 5 wherein the frame sections (9) are mounted at least in part on the sides of the flat section (10).

11. An arrangement in accordance with claim 1 wherein the support profile beam (4) includes at least two sections (4A, 4B) having front ends abutting against each other, and further including a joint (15) connecting the front ends of the sections of the support profile beam.

12. An arrangement in accordance with claim 11 wherein the joint (15) is rigid.

13. An arrangement in accordance with claim 11 wherein the sections (4A, 4B) of the support profile beam (4) abutting against each other can be twisted towards each other and the support profile beam (4) can be twisted in itself.

14. An arrangement in accordance with claim 11 wherein the sections (4A, 4B) of the support profile beam (4) abutting against each other can be pivoted towards each other.

15. An arrangement in accordance with claim 11 further including a roller support element (17) pivotable about the axis (16) of the joint (15), and deflection rollers (18A, 18B) for one of the hoistway (2) and return strand (3).

16. An arrangement in accordance with claim 15 wherein the roller support element (17) is in the form of a rotating pinion.

17. An arrangement in accordance with claim 16 wherein the deflection rollers (18A, 18B) maintain an expanded form of the conveyor belt (1) in a troughed or flat cross section at a loading station (19) or at a discharge station (20) for the material delivered.

18. An arrangement in accordance with claim 17 wherein one of the deflection rollers (18A) includes two rolling wheels (21A, 21B) having an axial direction which, when viewed along the axial direction of the rolling wheels, are at a distance from each other and form a gap (21C) between themselves.

19. An arrangement in accordance with claim 18 wherein the rolling wheels (21A, 21B) and the hoistway (2) form a loading space (22) for the material delivered.

20. An arrangement in accordance with claim 19 wherein the conveyor belt (1) maintained in expanded form by the rolling wheels (21A, 21B) has bent over edge areas (1A, 1B) in the direction of the axes of the rolling wheels, the bent over edge areas (1A, 1B) being located on the side of the rolling wheels (21A, 21B) facing away from the gap (21C).

21. An arrangement in accordance with claim 18 wherein the rolling wheels (21A, 21B), as viewed in cross section, have radially outwardly curved running surfaces (21D).

22. An arrangement in accordance with claim 21 further including an additional deflection roller (18C) provided in the expanded area of the conveyor belt (1), particularly at the loading station (19), on the side of the rolling wheels (21A, 21B) which is directed towards the end of the conveyor path, and wherein an S-shaped course of the conveyor belt (1) is defined between the rolling wheels (21A, 21B) and the additional deflection roller (18C).

23. An arrangement in accordance with claim 22 wherein the position of the axis (23) of the additional deflection roller (18C) with respect to the position of the axes of the rolling wheels (21A, 21B) is adjustable.

24. An arrangement in accordance with claim 23 wherein the conveyor belt (1) is maintained in level or troughed form, at least in the area of the loading station (19), by means of expanding rollers (25A, 25B, 25C) effective at the edge areas (1A, 1B) of the conveyor belt (1) which are arrangeable in pairs.

25. An arrangement in accordance with claim 1 wherein the support profile beam (4) can be telescoped.

26. An arrangement in accordance with claim 25 further including telescoping means for enabling the support profile beam (4) to be telescoped, the telescoping means being located at at least one free front end of at least one support profile beam (4) in the area of the one of the deflection stations (26A, 26B, 26C) of the conveyor path.

27. An arrangement in accordance with claim 26 wherein the telescoping means includes a piston/cylinder arrangement (27) for the telescoping ability.

28. An arrangement in accordance with claim 1 further including deflection rollers (18D, 18E) which are carried at the ends of the conveyor path by end areas (4C) of the support profile beam (4) or the piston (27B) or the cylinder (27A) of a piston/cylinder arrangement (27) while using a support bracket (28).

29. An arrangement in accordance with claim 28 wherein the support bracket (28) is pivotable with respect to the support profile beam (4).

30. An arrangement in accordance with claim 1 wherein the support profile beam (4) can be moved along its length by means of at least one guide rail (29).

31. An arrangement in accordance with claim 1 wherein the support profile beam (4) has an end section (4D) at least at one of its ends, the end section (40) of the support profile beam (4) being pivotable with respect to the remaining section of the support profile beam.

32. An arrangement in accordance with claim 1 wherein the supports (6, 7) have two profile sections (7A, 7B) which protrude approximately vertically from the support profile beam (4) and end at the lateral surfaces of the support profile beam (4).

33. An arrangement in accordance with claim 32 further comprising clamps (30) for connecting the profile sections (7A, 7B) to the support profile beam (4).

34. An arrangement in accordance with claim 1 wherein the support profile beam (4) itself can be supported by means of the supports (6, 7).

35. An arrangement in accordance with claim 17 wherein at least one beam (43) carries several expanding rollers (25) and is adjustable in its position with respect to the loading station (19).

36. An arrangement in accordance with claim 1 wherein the support profile beam (4) is arranged essentially centrally between at least one hoistway (2) and at least one return strand (3).

37. An arrangement in accordance with claim 3 wherein the support profile beam (4) carries in its interior hollow space (4F) a hoistway or a return strand and accommodates it while maintaining its form.

38. An arrangement in accordance with claim 37 further including a coating (44) provided on the interior wall of the hollow space (4F) or on the outer surface of the closed belt, the coating acting as a glide element for the closed belt.

39. An arrangement in accordance with claim 37 further including roller elements (46) gripping through openings (45) formed in a wall of the support profile beam.

40. An arrangement in accordance with claim 37 wherein the support profile beam carries roller support frames (5) for at least one additional conveyor belt strand.

41. An arrangement in accordance with claim 37 further including an additional support profile beam and at least an additional conveyor belt strand extending within the additional support profile beam.

42. An arrangement in accordance with claim 1 further comprising an intermediate drive for the closed belt carried by the support profile beam.

* * * * *